United States Patent [19]

Trutter et al.

[11] Patent Number: 4,779,927
[45] Date of Patent: Oct. 25, 1988

[54] LOCKING MECHANISM FOR A REAR SEAT BACK REST

[75] Inventors: Walter Trutter; Karl Stenz, both of Wiesbaden, Fed. Rep. of Germany

[73] Assignee: General Motors Corporation, Detroit, Mich.

[21] Appl. No.: 100,667

[22] Filed: Sep. 24, 1987

[30] Foreign Application Priority Data

Oct. 1, 1986 [DE] Fed. Rep. of Germany ... 8626167[U]

[51] Int. Cl.⁴ .............................................. B60N 1/10
[52] U.S. Cl. ............................. 297/379; 292/DIG. 38
[58] Field of Search .................... 297/379, DIG. 2; 269/65 R; 292/DIG. 38, 227

[56] References Cited

U.S. PATENT DOCUMENTS

| 2,922,673 | 1/1960 | Riley | 292/227 X |
| 4,540,206 | 9/1985 | Frame et al. | 292/DIG. 38 |
| 4,580,822 | 4/1986 | Fukumoto | 292/DIG. 38 |
| 4,639,040 | 1/1987 | Fujita et al. | 297/379 |
| 4,684,175 | 8/1987 | Trutter | 297/379 |
| 4,711,493 | 12/1987 | Schrom et al. | 292/379 |

FOREIGN PATENT DOCUMENTS 2531130  2/1984  France ................. 292/DIG. 38

Primary Examiner—Peter A. Aschenbrenner
Attorney, Agent, or Firm—Ernest E. Helms

[57] ABSTRACT

In a locking device for a rear seat back cushion, a locking lever forms a constructional unit together with its shaft and a tension spring pretensioning it in the locking direction. During assembly, this unit is inserted from one end into a pit in a plastic component and is retained in the end position by means of snap lugs. The locking lever is unlocked by means of an actuation rod hitched onto it.

10 Claims, 4 Drawing Sheets

LOCKING MECHANISM FOR A REAR SEAT BACK REST

FIELD OF THE INVENTION

The invention pertains to a locking device for a rear seat back cushion of a motor vehicle with a ratchet device placed in a plastic housing of the rear seat back cushion, which has a single-arm locking lever with a latching lug, pivotably mounted by means of a shaft in the plastic housing, which by means of a tension spring reaches towards a recess in a locking tongue of a rear part of the body, and in which a release device is provided in the rear seat back cushion to pivot the locking lever into the unlocked position, which has a rod which can be displaced within the rear seat back cushion. Such a locking device is the object of DE-OS No. 34 25 669.

Because of its simple construction, the previously known locking device guarantees reliable operation and long service life. It is designed so that rattling noises cannot occur, it is low in weight and it does not require high manufacturing precision either for the components used in it or with reference to the rear seat back cushion itself. However, since it is a mass-produced component produced in large numbers, there is the need to further minimize its production costs. In particular, with the known locking device, assembly outlay represents a significant cost factor.

The problem underlying the invention is that of designing a locking device of the type mentioned earlier so that it can be produced with the least possible cost without reducing or even losing the advantages it already possesses with respect to other locking devices.

According to the invention, this problem is solved by the fact that the shaft of the locking lever is located in a pit leading into the plastic housing from one side, which is as wide as the shaft is long, and it is retained there by two elastic snap lugs, with the shaft being located in each case between a contact surface at the end of the pit and snap surfaces of the snap lugs.

Because of this configuration, it is no longer necessary to lead a shaft through openings in the plastic housing and in the locking lever to retain the latter in the plastic housing. Instead, the locking lever can be introduced into the pit from the open end, with its shaft, as a unit, until the shaft automatically snaps into place in the end position and is thereby retained. Assembly time for the locking device is thus considerably shortened as compared to the conventional procedure, resulting in a significant cost reduction. Besides the simple insertion or clip connection, the locking device according to the invention is distinguished by light weight, damped operating characteristics and a wide degree of height and width tolerance for the locking tongues. Added to this are long service life and high operating safety.

It is also advantageous if a passage is located in each of the side surfaces of the plastic housing, aligned with the assembled shaft. In this manner, it is possible to push a connecting rod onto the shaft so as to couple the locking device with a further locking device, so that when the one locking device is manually unlocked, the other necessarily unlocks along with it.

The connecting rod is nonrotatably attached to the shaft in a simple manner if, according to one advantageous embodiment of the invention, each end of the shaft has a flat over which is slid a connecting rod leading to another locking device.

It is also advantageous if the open end of the pit is at least partially covered by a cover which is injection-molded onto the plastic housing and attached to it by a film hinge. It is thereby possible to prevent foam from penetrating into the locking device during assembly and negatively affecting its operation.

It is possible to create the possibility of securing the cover in the closed position with particularly low outlay if the cover is designed to be secured in the closed position by means of at least one catch on the plastic housing.

The locking lever can be attached to its actuation rod in a particularly simple and reliable manner if the locking lever has an eye for hitching up the actuation rod of the release device.

A further contribution to reduced assembly costs is made if, according to another embodiment of the invention, the locking lever is configured together with the shaft and the tension spring as a subassembly that can be inserted into the pit. In this embodiment, the locking lever with its shaft and the tension spring can be inserted as a unit into the plastic housing.

It is also favorable if the latching lug is curved, and if the center of curvature lies outside the shaft of the locking lever. The result of this embodiment is that the locking lever is automatically drawn into the locking shackle.

The plastic housing can be attached to the back wall of the rear seat back cushion with extremely low outlay if bushings for drift rivets are provided in the plastic housing for the attachment thereof.

The tension spring can be very rapidly and easily assembled if it is a single-side leg spring, one leg of which presses against the locking lever, and the other leg of which presses against the plastic housing.

The invention admits of many embodiments. To explain it further, one of them is illustrated in the drawing and will be described below.

Other objects, desires and advantages of the present invention will become more apparent to those skilled in the art as the nature of the invention is better understood from the accompanying drawings and a detailed description.

DETAILED DESCRIPTION OF THE DRAWINGS

Figures 1, 2:
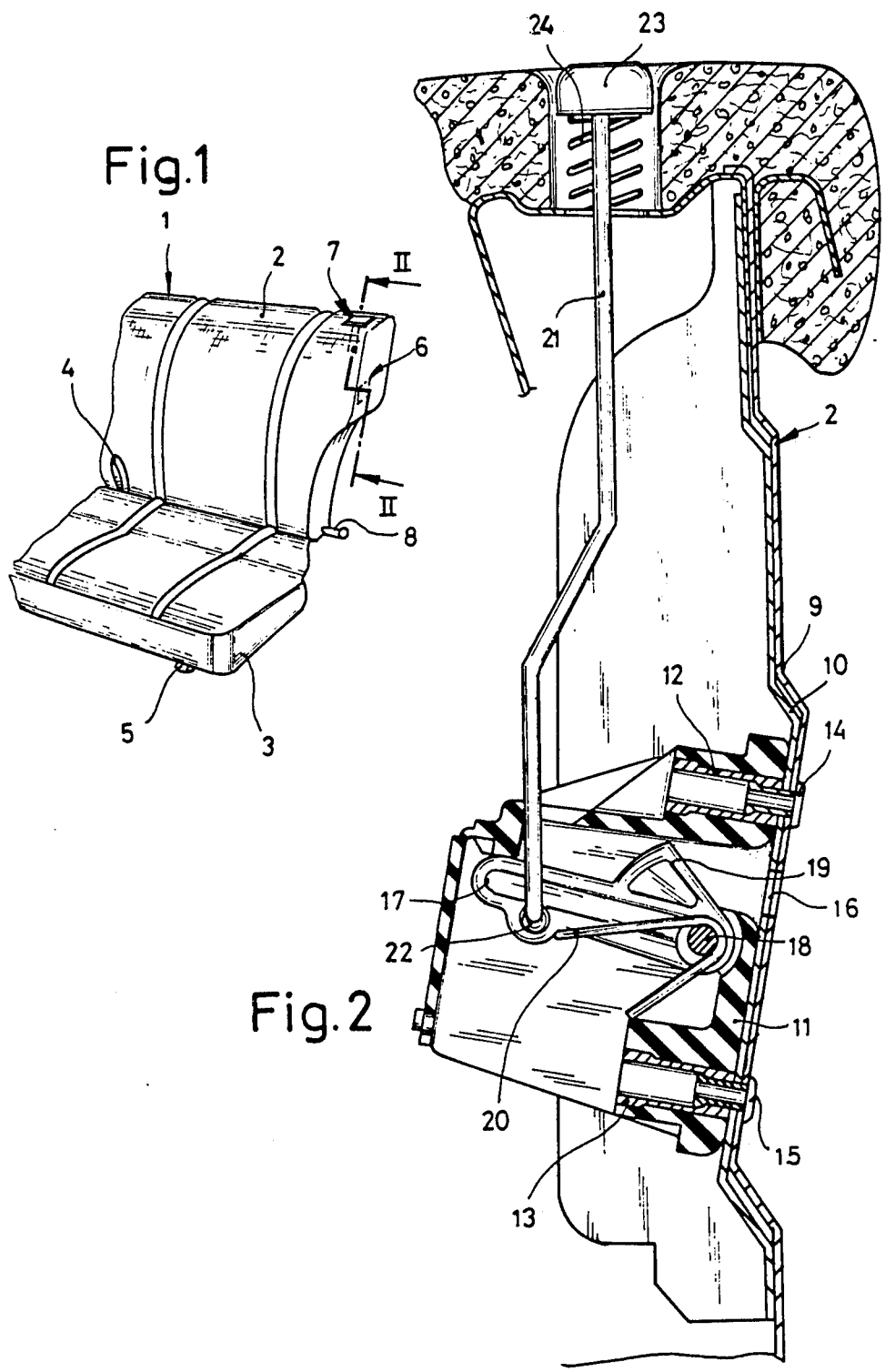
FIG. 1 is a perspective view of a side area of the rear seat of a motor vehicle configured according to the invention.
FIG. 2 is a section, at greatly enlarged scale, along the lines II—II in FIG. 1.

FIG. 1 shows the side area of a rear seat 1, which is composed of a rear seat back cushion 2 and a seat cushion 3. The seat cushion 3 can be lifted by means of a strap 4 at its rear edge and pivoted to a vertical position. For this purpose, hinges 5 are provided on the front edge of the seat cushion 3.

Shown with dashed lines in FIG. 1 is a locking device 6 which can be unlocked by means of a release device 7 on the rear seat back cushion 2. The unlocked rear seat back cushion 2 can be folded forward about a shaft 8.

FIG. 2 illustrates more precisely the components essential to the invention. The upper part of the rear seat back cushion 2 is visible. The rear seat back cushion 2 has a back wall 9, against the inner side of which a plastic housing 11, ribbed to save weight, is attached, with a reinforcement panel 10 in between. For this purpose, two bushings 12, 13 are pressed into the plastic housing 11, into which drift rivets 14, 15 engage. Not shown is a locking tongue which is attached behind the back wall 9 to a part of the body, for example, by welding, and which projects through an opening 16 in the back wall 9 into the plastic housing 11.

Located within the plastic housing 11 is a locking lever 17, which can pivot about a shaft 18. This locking lever 17 has a latching lug 19, by means of which it engages, in the locked position, in the locking tongue (not shown). A tension spring 20 presses on one side against the plastic housing 11 on the other side against the locking lever 17 and thus pretensions them in the locking direction, namely, clockwise.

To unlock the locking lever 17, one end of an actuation rod 21 engages in an eye 22 in the locking lever 17. At its other end, the actuation rod 21 has an actuation knob 23. A compression spring 24 pretensions the actuation rod 21 upward, so that rattling cannot occur. If the actuation knob 23 is pressed, the actuation rod 21 moves downward and thereby pivots the locking lever 17 counterclockwise, so that the latter moves into the unlocked position.

Figure 3:
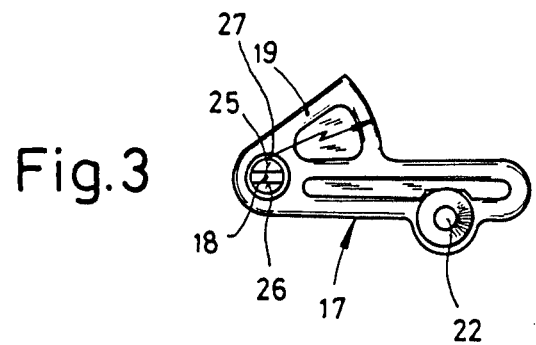
FIG. 3 is a view of a locking lever of the locking device accordingto FIG. 2.
Figure 4:
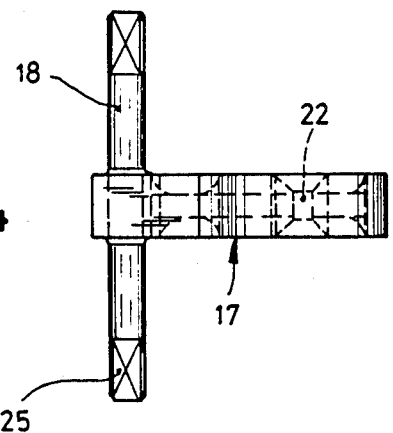
FIG. 4 is a plan view of the locking lever.

FIGS. 3 and 4 show the configuration of the locking lever 17 in more detail. We see that the locking lever 17 together with its shaft 18 forms a unit. The shaft 18 has flats 25, 26 at each end, as a result of which it can be inserted in a nonrotating manner into a connecting rod (not shown), so as to actuate a second locking device in synchrony with the locking device 6 illustrated, if only one actuation knob 23 is pressed. FIGS. 3 and 4 also illustrate the eye 22 for hitching up the actuation rod 21. The plastic housing 11 is configured so that the actuation rod 21 is located in the eye 22 by means of the plastic housing 11, so that no additional attachment elements are necessary. FIG. 3 furthermore shows the latching lug 19 which is curved in outline and has a center of curvature 27 which lies above the shaft 18.

Figure 5:
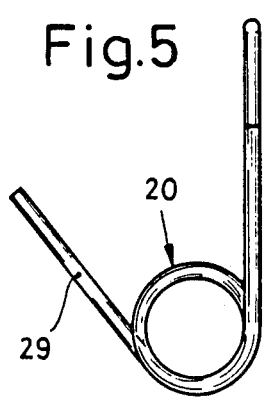
FIG. 5 is a side view of a tension spring for the locking lever according to FIG. 3.
Figure 6:
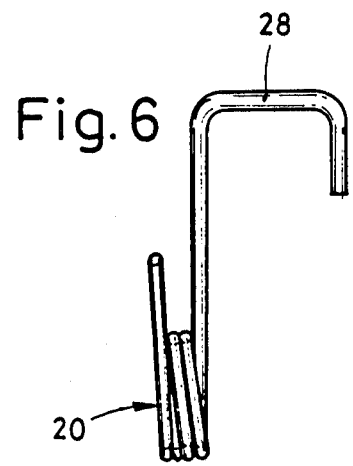
FIG. 6 is a front view of the tension spring according to FIG. 4.

FIGS. 5 and 6 show that the tension spring 20 is a single-side leg spring which has one leg 28 bent into a U-shape to fit around the locking lever 17 and one straight leg 29 which presses against the inside of the plastic housing 11.

Figure 7:
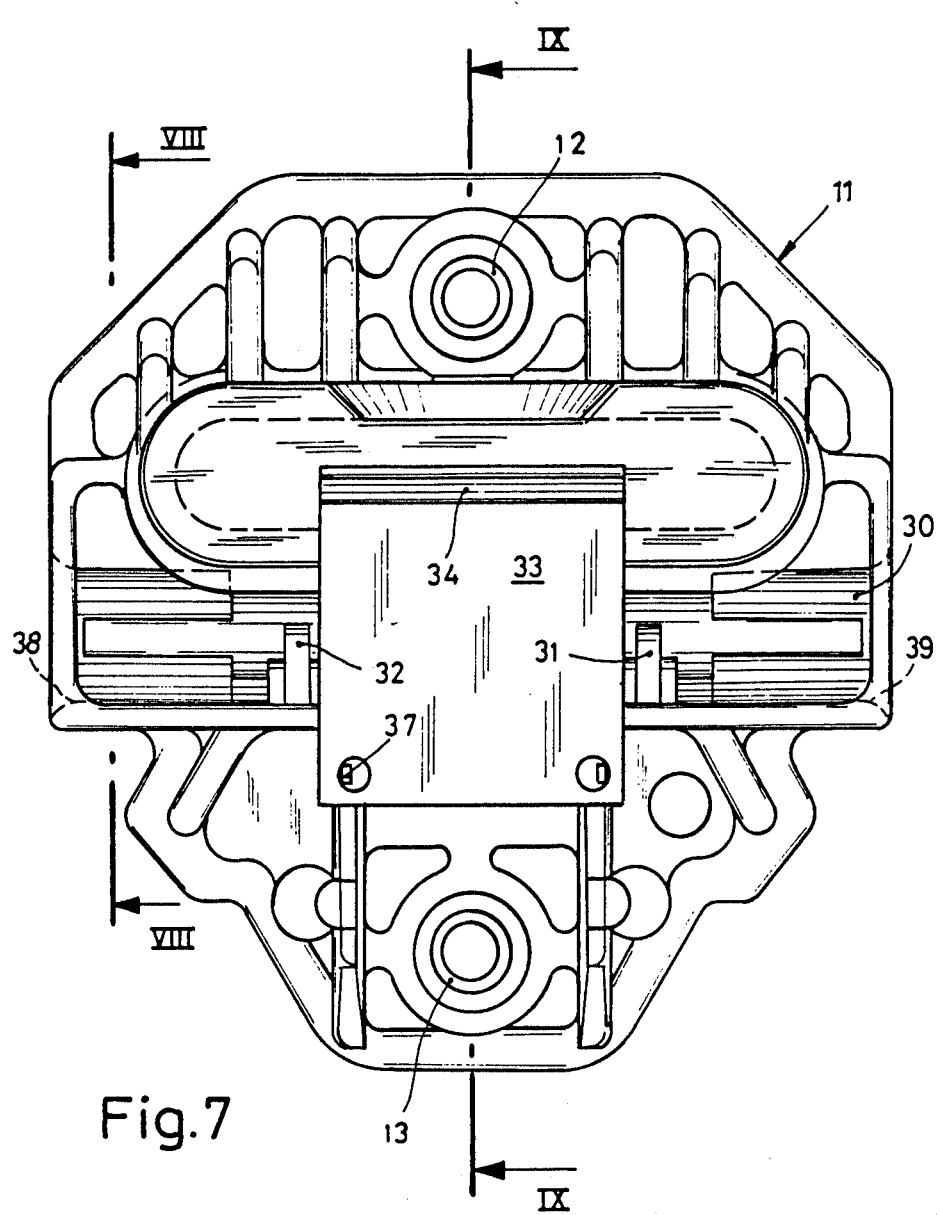
FIG. 7 is a view of the plastic housing of the locking device.

FIG. 7 shows the plastic housing 11 in detail. It shows a pit 30 into which two snap lugs 31, 32 project from below. Also shown in FIG. 7 are the bushings 12 and 13 which serve to accommodate the drift rivets 14, 15 shown in FIG. 2. A cover 33, shown half open, is formed onto the plastic housing 11 by means of a flat hinge 34. In the closed position, this allows the pit 30 to be partially covered. The dashed lines show the passages 38, 39 on the two opposite side walls, which are aligned with the assembled shaft so that a connecting rod (not shown) can be placed through each of these passages 38, 39, to couple the shaft with another shaft of a further locking device.

Figure 8:
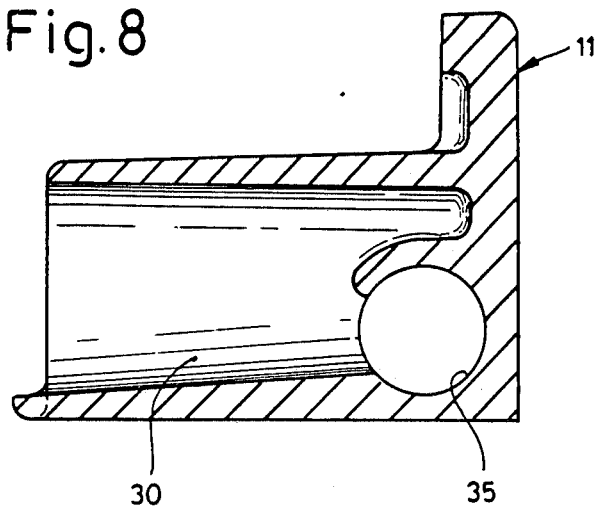
FIG. 8 is a section through the plastic housing along line VIII—VIII in FIG. 7.

The cross-sectional representation in FIG. 8 indicates that the pit 30 is open at one end and is defined at the other end by a contact surface 35 whose curvature matches that of the diameter of the shaft 18. The pit 30 is dimensioned so that the locking lever 17 with its shaft 18 can be inserted from the open end into this pit 30 until the shaft 8 reaches the contact surface 35.

Figure 9:
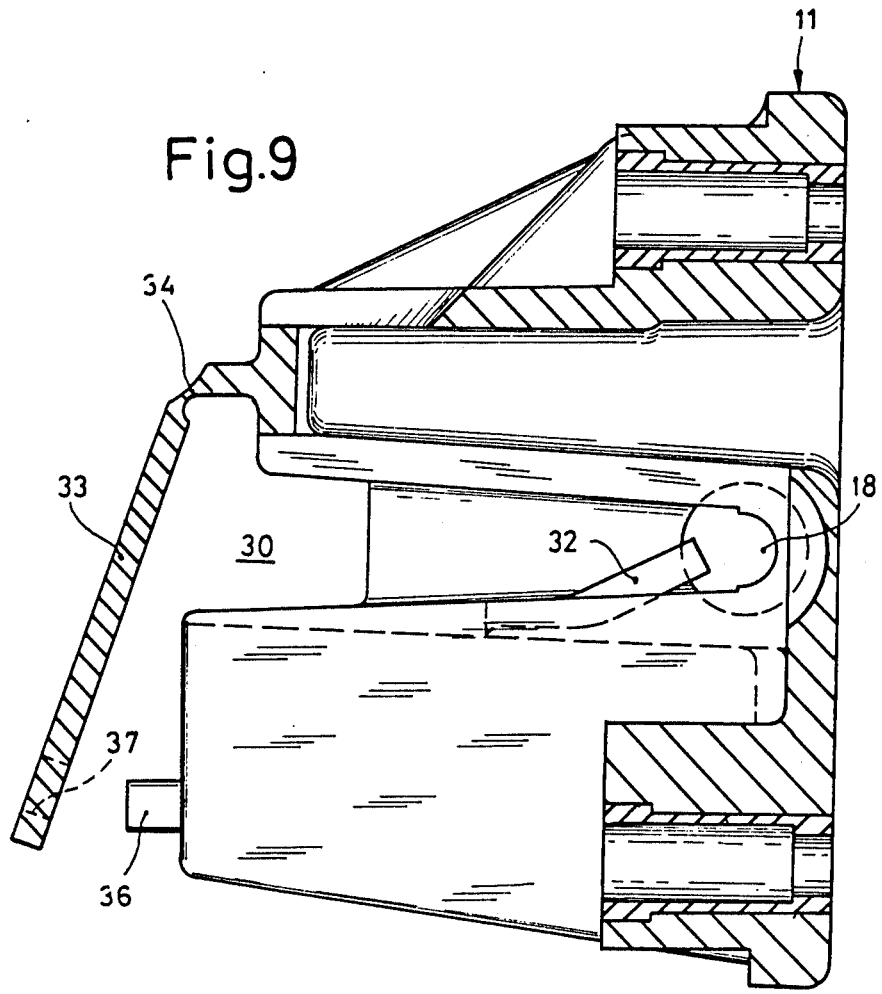
FIG. 9 is a section through the plastic housing along line IX—IX in FIG. 7.

FIG. 9 shows that the shaft 18 is retained in its end position by the snap lugs 31, 32, of which only the snap lug 32 may be seen in FIG. 9. During assembly, therefore, all that is needed is to insert the locking lever 17 with its shaft 18 and the tension spring 20 into the pit 30 until the snap lugs 31, 32 are first forced aside and thereafter snap into place behind the shaft 8, whereby the latter is securely retained in the pit 30.

Also visible in FIG. 9 is the cover 33 which because of the elasticity of the flat hinge 34 can be folded down in front of the pit 30. The plastic housing 11 has snap projections 36 which, when the cover 33 is in the closed position, can snap into openings 37 in the cover 33 and thereby secure them in the closed position.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A locking device for a rear seat back cushion of a motor vehicle with a ratchet device placed in a plastic housing of the rear seat back cushion, which has a single-arm locking lever with a latching lug, pivotably mounted by means of a shaft in the plastic housing, which by means of a tension spring reaches towards a recess in a locking tongue of a rear part of the body, and in which a release device is provided in the rear seat back cushion to pivot the locking lever into the unlocked position, which has a rod which can be displaced within the rear seat back cushion, characterized by the fact that the shaft of the locking lever is located in a pit leading into the plastic housing from one side, which is as wide as the shaft is long, and it is retained there by two elastic snap lugs with the shaft being located in each case between a contact surface at the end of the pit and snap surfaces of the snap lugs.

2. A locking device according to claim 1, characterized by the fact that a passage is located in each of the side surfaces of the plastic housing aligned with the assembled shaft.

3. A locking device according to claim 1, characterized by the fact that each end of the shaft has a flat over which is slid a connecting rod leading to another locking device.

4. A locking device according to claim 1, characterized by the fact that the open end of the pit is at least partially covered by a cover which is injection-molded onto the plastic housing and is attached to it by a flat hinge.

5. A locking device according to claim 4, characterized by the fact that the cover is designed to be secured in the closed position by means of at least one catch projection on the plastic housing.

6. A locking device according to claim 1, characterized by the fact that the locking lever has an eye for hitching up the actuation rod of the release device.

7. A locking device according to claim 1, characterized by the fact that the locking lever is configured together with the shaft and the tension spring as a subassembly that can be inserted into the pit.

8. A locking device according to claim 1, characterized by the fact that the latching lug is curved and that the center of curvature lies outside the shaft of the locking lever.

9. A locking device according to claim 1, characterized by the fact that bushings for drift rivets are provided in the plastic housing for the attachment thereof.

10. A locking device according to claim 1, characterized by the fact that the tension spring is a single-side leg spring, one leg of which presses against the locking lever and the other leg of which presses against the plastic housing.

* * * * *